United States Patent [19]
Frusti et al.

[11] Patent Number: 5,505,520
[45] Date of Patent: Apr. 9, 1996

[54] PASSENGER SEAT WITH ADJUSTABLE LUMBAR SUPPORT

[75] Inventors: Thomas M. Frusti, Canton; Daniel C. Bach, Jr., Belleville; Robert F. Kukla, Dearborn Heights, all of Mich.

[73] Assignee: Ford Motor Company, Dearborn, Mich.

[21] Appl. No.: 333,710

[22] Filed: Nov. 3, 1994

[51] Int. Cl.⁶ ..................................................... A47C 7/46
[52] U.S. Cl. ......................................................... 297/284.4
[58] Field of Search ............................. 297/284.1, 284.4

[56] References Cited

U.S. PATENT DOCUMENTS

| | | |
|---|---|---|
| 3,698,670 | 10/1972 | Ewing . |
| 3,762,769 | 10/1973 | Poschl .................................. 297/284.4 |
| 3,929,374 | 12/1975 | Hogan et al. . |
| 4,085,963 | 4/1978 | Bullerdieck . |
| 4,313,637 | 2/1982 | Bailey ................................... 297/284.4 |
| 4,354,709 | 10/1982 | Schuster . |
| 4,469,374 | 9/1984 | Kashihara et al. . |
| 4,531,779 | 7/1985 | Hashimoto ............................ 297/284.4 |
| 4,564,235 | 1/1986 | Hatsutta et al. ....................... 297/284.4 |
| 4,834,420 | 5/1989 | Sankrithi et al. . |
| 5,026,116 | 6/1991 | Dal Monte ......................... 297/284.4 X |
| 5,197,780 | 3/1993 | Coughlin ........................... 297/284.4 X |

FOREIGN PATENT DOCUMENTS

| | | |
|---|---|---|
| 1430028 | 8/1960 | Germany . |
| 2724725 | 12/1977 | Germany ............................. 297/284.4 |
| 2856784 | 7/1979 | Germany ............................. 297/284.4 |
| 809734 | 3/1959 | United Kingdom . |

OTHER PUBLICATIONS

New Biomechanical Models for Automobile Seat Design, Hubbard, Haas, Boughner, Canole, & Bush, Mar. 1–5, 1993, pp. 1–8.

*Primary Examiner*—Peter R. Brown
*Attorney, Agent, or Firm*—Gregory P. Brown; Roger L. May

[57] ABSTRACT

A passenger seat (10) having a seat base (12) and a seam back (14) including an adjustable lumbar support member (70) is disclosed for enhancing passenger comfort and reducing passenger fatigue during long trips. The seat back (14) includes a pelvic support member (60) and a thoracic support member (74) flexibly interconnected to the lumbar support member (70) such that when the lumbar support member is adjusted, the pelvic and thoracic support members adjust to provide improved support for the back of the passenger.

10 Claims, 4 Drawing Sheets

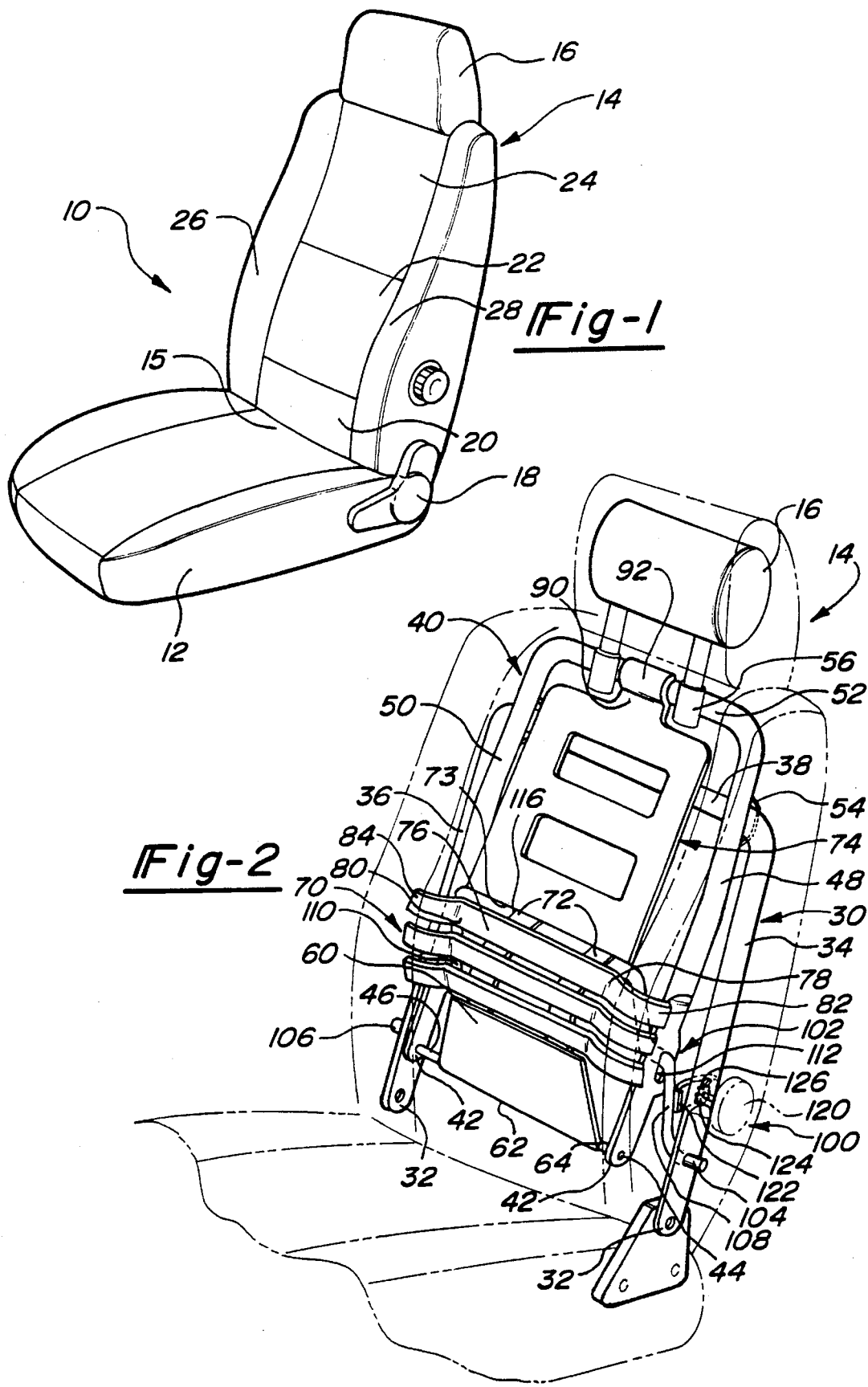

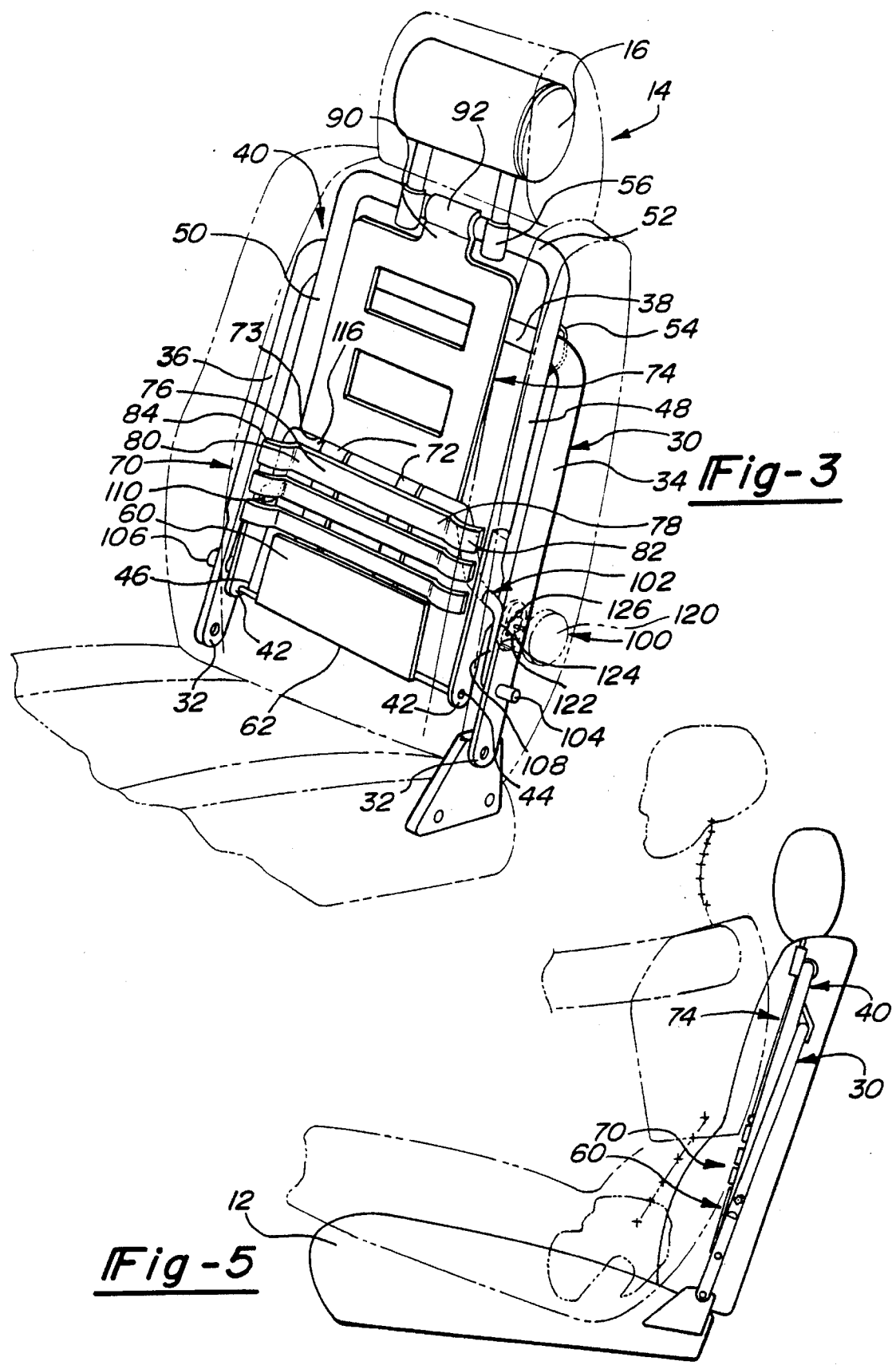

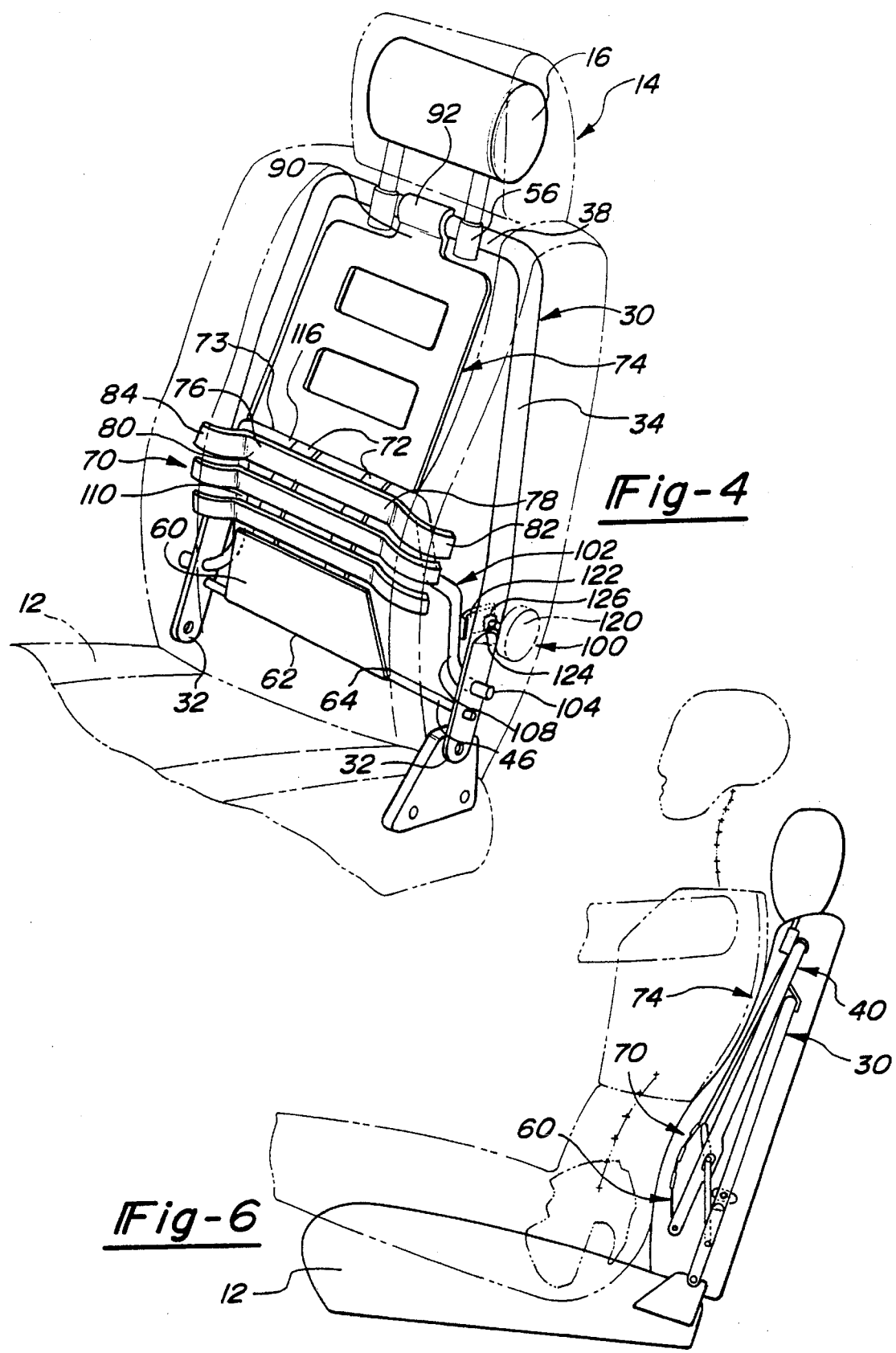

5,505,520

PASSENGER SEAT WITH ADJUSTABLE LUMBAR SUPPORT

BACKGROUND OF THE INVENTION

1. Field of the Invention

This invention relates generally to a passenger seat for a motor vehicle. More specifically, the present invention relates to an adjustable lumbar support for use therein.

2. Disclosure Information

Passenger seat designers often incorporate adjustable lumbar support mechanisms in their designs to help reduce passenger fatigue experienced during extended rides. One such example is disclosed in U.S. Pat. No. 4,469,374. These systems typically provide a mechanism or inflatable device located in the seat back adjacent to the lumbar region of the passenger's back. This allows the passenger to adjust the extent to which a lumbar support member protrudes from within the seat back. As a passenger begins to experience fatigue, adjusting the position of the lumbar support member can reduce fatigue and increase customer satisfaction.

The comfort of a seat back is related to the manner the seat back distributes the passenger's weight. It has been observed by some customers that adjusting the lumbar support member outward from the retracted position can drastically alter this pressure distribution and lead to discomfort. This is especially exacerbated by adjustable lumbar mechanisms that only move the lumbar portion of the seat back forward into the passenger's back. In doing so, load is transferred from the pelvis and thorax of the passenger's back and directed to lumbar area of the passenger's back. This pressure concentration significantly detracts from the passenger's comfort.

It would be desirable to provide a passenger seat that would allow the passenger to adjust the lumbar support member through a range of positions while still providing support for the pelvic and thorax of the passenger's back.

SUMMARY OF THE INVENTION

The present invention provides a passenger seat including a seat back having an adjustable lumbar portion. Adjusting the lumbar portion also adjusts other seat back support portions to maintain desirable pressure distribution over all of the surfaces throughout the range of lumbar adjustment. This design enhances passenger comfort and reduces fatigue during extended rides.

In the presently preferred embodiment, the passenger seat comprises a seat base and a seat back extending from a rearward edge of the seat base. The seat back also comprises a seat back frame for supporting the seat back and a pelvic support member disposed adjacent to the seat base. The pelvic support member is pivotably attached to the seat back frame. The seat back also includes a lumbar support member flexibly joined to the pelvic support member and a thoracic support member. The thoracic support member includes a first end flexibly attached to the lumbar support member opposite from the pelvic support member and a second end pivotally attached to the seat back frame.

The seat back also includes an actuation mechanism for displacing the lumbar support member, the pelvic support member and the thoracic support member from a retracted position to an extended position thereby providing a smooth back support surface for all positions of the lumbar support member.

Other objects, features and advantages of the present invention will become apparent to those skilled in the art from the drawings, detailed description and claims which follow.

BRIEF DESCRIPTION OF THE DRAWINGS

FIG. 1 is a perspective view of a passenger seat having an adjustable lumbar support according to the present invention.

FIG. 2 is a perspective view of a passenger seat back having an adjustable lumbar support mechanism in an extended position according to the present invention.

FIG. 3 is a perspective view of a passenger seat back having an adjustable lumbar support mechanism in a retracted position according to the present invention.

FIG. 4 is a perspective view of an alternative embodiment of a passenger seat back having an adjustable lumbar support mechanism in an extended position according to the present invention.

FIG. 5 is an elevational view of a passenger seat illustrating the support provided when the lumbar support member is in the retracted position.

FIG. 6 is an elevational view of a passenger seat illustrating the support provided when the lumbar support member is in the extended position.

DETAILED DESCRIPTION OF THE PREFERRED EMBODIMENTS

Figure 2A:
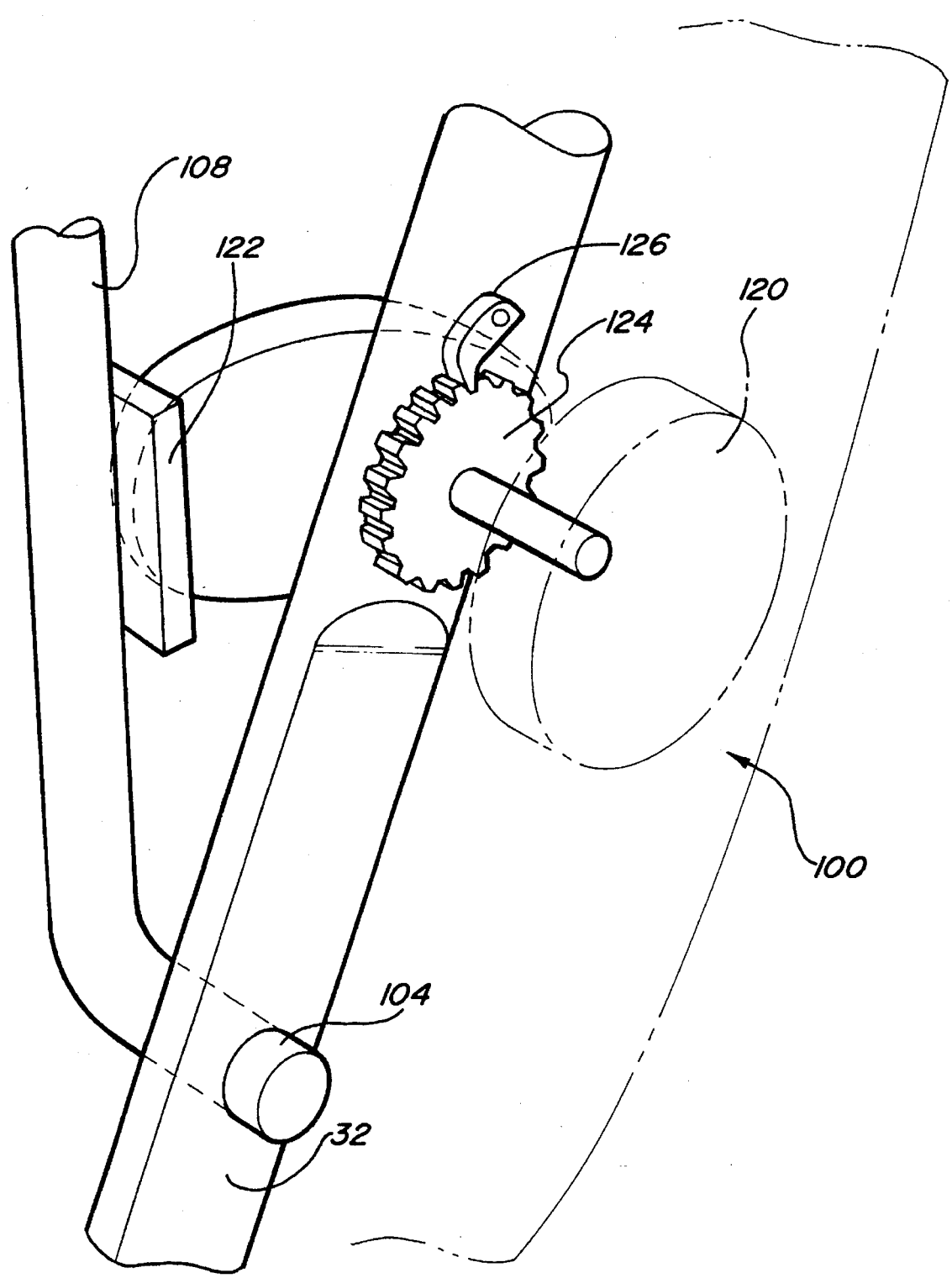
FIG. 2a is an enlarged perspective view of an actuator mechanism disposed in a passenger seat back having an adjustable lumbar support according to the present invention.

Referring now to the figures, FIG. 1 illustrates a passenger seat 10 for a motor vehicle having a seat base 12 and a seat back 14 extending upward from a rearward edge 15 of said seat base 12. The passenger seat 10 may include a headrest 16 and a reclining mechanism 18 to allow adjustment of the angle of the seat back 14. The seat back 14 supports a passenger's back with a pelvic support portion 20, a lumbar support portion 22, a thorax support portion 24 and right and left bolsters 26, 28.

FIGS. 2 and 3 illustrate the internal mechanisms of the seat back 14 in fully extended and retracted positions, respectively. A generally U-shaped seat back frame 30 includes first ends 32 for attachment to the seat base 12. This attachment may either be fixed or may provide reclining motion of the seat back 14. The seat back frame 30 further includes upwardly extending right and left sides 34, 36 interconnected by a first lateral portion 38 of the seat back frame 30.

In a preferred embodiment, the seat back frame 30 is augmented by a generally U-shaped articulated frame 40 including right and left second ends 42, each having an aperture 44 for receiving a pivot rod 46 therethrough. The articulating frame 40 further includes right and left upstanding portions 48, 50 extending upward beyond the first lateral portion 38 of the seat back frame 30 and interconnected by a second lateral portion 52 of the articulating frame 40. Pillow block style fasteners 54 pivotally support the articulating frame 40 from the first lateral portion 38 of the seat back frame 30. These fasteners 54 may consist of a simple U-bolt fastened to the upstanding portions 48, 50. To provide for smoother operation, a lubricating material, such as Teflon™ may be disposed between the rotating components of the fastener. The second lateral portion 52 of the articulating frame 40 may include adjustable fasteners 56 for attachment of the headrest 16.

As further illustrated in FIGS. 2 and 3, seat back 14 includes three principle support members for supporting the back of the passenger. A substantially rigid pelvic support member 60 includes a first edge 62 adjacent to the rearward edge 15 of seat base 12. The first edge 62 includes an aperture 64 for rotatably receiving the pivot rod 46 therethrough. In the preferred embodiment the pelvic support member 60 is substantially planar, however, contouring of the pelvic support member 60 to provide a conforming fit to the pelvis of the passenger is clearly contemplated by the present invention.

A lumbar support member 70 provides support for the lumbar portion 22 of the seat back 14. The lumbar support member 70 includes at least one vertically oriented flexible strap 72 extending from the pelvic support member to a first edge 73 of a thoracic support member 74. At least one lumbar slat 76 extends laterally, transverse to the flexible strap, between right and left ends 78, 80. The lumbar slat 76 is sufficiently rigid to resist deformation under the weight of the back of the passenger. In the preferred embodiment lumbar slats 76 include right and left wings 82, 84 disposed on right and left ends 78, 80. The flexible straps 72 may be bonded or secured with threaded fasteners to the pelvic support member 60, the lateral slats 76 and the thoracic support member 74.

The thoracic support member 74 includes a second end 90 that is pivotally attached to the second lateral portion 52 of the articulating frame 40. The thoracic support member 74 is substantially rigid, and may be shaped to conform to the thorax of the passenger. In the preferred embodiment the thoracic support member 74 also includes a cylindrical portion 92 extending from the second end 90 to rotatably receive a section of the second lateral portion 52 therein.

An actuator mechanism 100 disposed adjacent to the lumbar portion 22 of the seat back 14 provides the ability to adjust the position of the lumbar support member 70. In the preferred embodiment, the actuator mechanism 100 includes a link 102 having right and left link ends 104, 106 pivotally attached to the first ends 32 of the seat back frame 30. The link 102 further includes right and left intermediate portions 108, 110 slidably and pivotally passing through right and left slots 112 located in right and left upstanding portions 48, 50 of the articulating frame 40. A lumbar portion 116 extends between and connects the right and left intermediate portions 108, 110. When actuated, the lumbar portion 116 urges the lumbar support member 70 between retracted and extended positions.

The actuator mechanism 100 further includes a handle 120 mounted on the seat frame 30 and rotatably attached to a cam 122. The cam 122 contacts the right intermediate portion 108 of the link 102. An anti-reversing gear 124 and pawl 126 may be provided to lock the cam 122, link 102 and lumbar support member 70 in an adjusted position. The present invention is not limited to an actuator mechanism as described above. Many alternatives will occur to those skilled in the art on the basis of these teachings. For example, it is also contemplated that an inflatable device, commonly used for lumbar actuation, could be readily installed in place of the lumbar portion 116 of the link 102 to provide similar functionality. Similarly, an electric motor could drive the cam 122.

Referring now to FIG. 4, where like numbers refer to like parts, an alternative embodiment of the present invention having the articulating frame removed is shown. In this embodiment, the pivot rod 46 attaches to the first end 32 of the seat back frame 30, and the cylindrical portion 92 attaches to the first lateral portion 38 of the seat back frame 30. As in the previously described embodiment, an inflatable device or an electric motor could be substituted in the actuator mechanism 100.

Those skilled in the art will appreciate the components of the present invention can be made from a variety of conventional materials. The seat back frame 30 and the articulating frame 40 can be made from materials capable of sustaining compressive and tensile loads. Such materials include, but are not limited to, steel, aluminum, and high strength synthetic polymeric materials such as high strength polycarbonate. Similarly, the pelvic, lumbar slats and thoracic support members may all be stamped from steel, aluminum and other materials. The flexible straps may be constructed from any elastic material having resilient properties.

Referring to FIGS. 2–3, 5 and 6, operation of the preferred embodiment will now be described. FIGS. 3 and 5 illustrate the lumbar support member 70 adjusted to the fully retracted position. In this position, the flexible straps 72 assume a first radius of curvature when viewed from the side. As a passenger desires to vary the amount of lumbar support, or simply change the present posture to improve circulation, the passenger activates the actuator mechanism 100 by rotating the handle 120. This causes the cam 122 to rotate against the right intermediate portion 108 of the link 102, urging the lumbar portion 116 against the lumbar support member 70. The flexible straps 72 of the lumbar support member 70 bend between the lumbar slats 76, allowing the lumbar support member 70 to assume various radii of curvature relative to an axis parallel to a longitudinal axis of the lumbar slats 76. The passenger can adjust the lumbar support member 70 to any position between the fully retracted and fully extended positions. FIGS. 2 and 6 illustrate the fully extended position where the flexible strap 72 has assumed a second radius of curvature.

As the passenger adjusts the lumbar support member 70, the pelvic support member 60 and the thoracic support member 74 simultaneously adjust to provide a smooth, continuous support surface between all three support members in any adjusted position. Additionally, simultaneous adjustment of the right and left bolsters 26, 28 occurs due to right and left wings 82, 84. In the preferred embodiment, locating the second lateral portion 52 of the articulating frame 40 above the attachment point to the first lateral portion 38 of the seat back frame 30 permits the passenger shoulder to rotate rearward relative to the pelvis. This significantly improves the comfort of the passenger.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of my invention.

We claim:

1. A passenger seat for a motor vehicle, said passenger seat comprising:

a seat base;

a seat back supported on a seat back frame having a first end attached to said seat base and a first lateral portion opposite therefrom;

an articulating frame having right and left second ends disposed adjacent to said seat base and upwardly extending right and left portions extending beyond said first lateral portion of said seat back frame to a second lateral portion interconnecting said right and left upstanding portions;

fastening means disposed on said right and left upstanding portions of said articulating frame, said fastening means being adapted to pivotally support said articulating frame from said first lateral portion of said seat back frame;

a pelvic support member having a first edge disposed on a pivot rod extending between said right and left second ends of said articulating frame;

a lumbar support member attached to said pelvic support member opposite said pivot rod;

a thoracic support member attached to said lumbar support member opposite said pelvic support member and a cylindrical portion opposite said lumbar support member, said cylindrical portion being adapted to receive said second lateral portion of said articulating frame therethrough; and actuation means operatively engaging said lumbar support for displacing said lumbar support member, said pelvic support member and said thoracic support member from a retracted position to an extended position thereby providing a smooth back support surface for all positions of said lumbar support member.

2. A passenger seat according to claim 1, wherein said lumbar support member further comprises:

a flexible strip extending from said pelvic support member to said thoracic support member; and a lumbar slat transversely disposed on said flexible strip and having right and left ends.

3. A passenger seat according to claim 2, wherein said lumbar slat further comprises a right wing disposed on said right end of said lumbar slat and a left wing disposed on said left end of said lumbar slat, said wings being adapted to support right and left lumbar bolsters.

4. A passenger seat according to claim 1, wherein said lumbar support member further comprises:

a flexible strip extending from said pelvic support member to said thoracic support member; and a plurality of lumbar slats disposed on said flexible strip, said lumbar slats being operative to permit said lumbar support member to flex from a first radius of curvature in said retracted position to a second radius of curvature in said extended position.

5. A passenger seat according to claim 4, wherein each of said lumbar slats further comprises a right wing disposed on said right end of said lumbar slat and a left wing disposed on said left end of said lumbar slat, said wings being adapted to support right and left lumbar bolsters.

6. A passenger seat according to claim 1, wherein said lumbar support member is more flexible than said pelvic support member and said thoracic support member.

7. A passenger seat according to claim 1, wherein said actuation means further comprises:

a link having a lumbar portion disposed adjacent to said lumbar support member and having right and left link ends pivotally disposed in said seat back frame;

said link also having right and left intermediate portions disposed between said lumbar portion and said right and left link ends, said intermediate portions being adapted to be slidably and pivotally received in right and left slots in said right and left upstanding portions of said articulating frame; and a handle connected to a cam, said handle being manually operative to rotate said cam against said link to urge said lumbar support member from said retracted position to said extended position.

8. A passenger seat according to claim 7, wherein said actuation means further comprises an anti-reversing gear and a pawl to maintain said lumbar support member in a desired position.

9. A passenger seat according to claim 1, wherein said pelvic support member and said thoracic support member are substantially rigid members.

10. A passenger seat for a motor vehicle, said passenger seat comprising:

a seat base;

a seat back supported on a seat back frame having a first end attached to said seat base and a first lateral portion opposite therefrom;

an articulating frame having right and left second ends disposed adjacent to said seat base and upwardly extending right and left portions extending beyond said first lateral portion of said seat back frame to a second lateral portion interconnecting said right and left upstanding portions;

fastening means disposed on said right and left upstanding portions of said articulating frame, said fastening means being adapted to pivotally support said articulating frame from said first lateral portion of said seat back frame;

a pelvic support member having a first edge disposed on a pivot rod extending between said right and left second ends of said articulating frame;

a lumbar support member having a flexible strip attached to said pelvic support member and a plurality of lumbar slats disposed on said flexible strip;

a thoracic support member having attached to said flexible strip of said lumbar support member and cylindrical portion opposite said lumbar support member, said cylindrical portion being adapted to receive said second lateral portion of said articulating frame therethrough; and actuation means operatively engaging said lumbar support for flexing said lumbar support member from a first radius of curvature in a retracted position to a second radius of curvature in an extended position, thereby providing a smooth back support surface for all positions of said lumbar support member.

* * * * *